United States Patent [19]

Muller et al.

[11] 4,164,780

[45] Aug. 14, 1979

[54] APPARATUS FOR A REMOVABLE LAMP

[75] Inventors: Thomas P. Muller; Philip J. Blatner, both of Aurora, Ill.

[73] Assignee: Caterpillar Tractor Co., Peoria, Ill.

[21] Appl. No.: 916,457

[22] Filed: Jun. 16, 1978

[51] Int. Cl.² .............................................. B60Q 1/00
[52] U.S. Cl. ..................................... 362/64; 362/368; 362/396
[58] Field of Search ........................... 362/64, 368, 396

[56] References Cited

U.S. PATENT DOCUMENTS 3,676,665 7/1972 Louis .................................... 362/374

Primary Examiner—Stephen J. Lechert, Jr.
Attorney, Agent, or Firm—Frank L. Hart

[57] ABSTRACT

A housing assembly (10) connects a lamp (11) to a frame (12) of a work vehicle (53) or machine for general illumination. The lamp (11) is removable for use as an inspection lamp. The frame (12) has an opening (14) and a first flange (16). In the assembly (10), a lamp housing (24) has first and second opposed walls (28,30) and a front wall (32). The housing (24) is movable between a first position (34) at which the front wall (32) covers the frame opening (14) and a second position (36) at which the front wall (32) is spaced from the frame opening (14). The flange (16) and first wall (28) each have a respective one of a protrusion (20) and opening (22). The protrusion (20) and opening (22) are mated at the first position (34). Apparatus (26) removably connects the housing (24) to the frame (12) and maintains the housing (24) at the first position (34) for using the lamp (11) fixed to the frame (12) and allowing removal of the lamp (11) for use at other locations.

9 Claims, 3 Drawing Figures

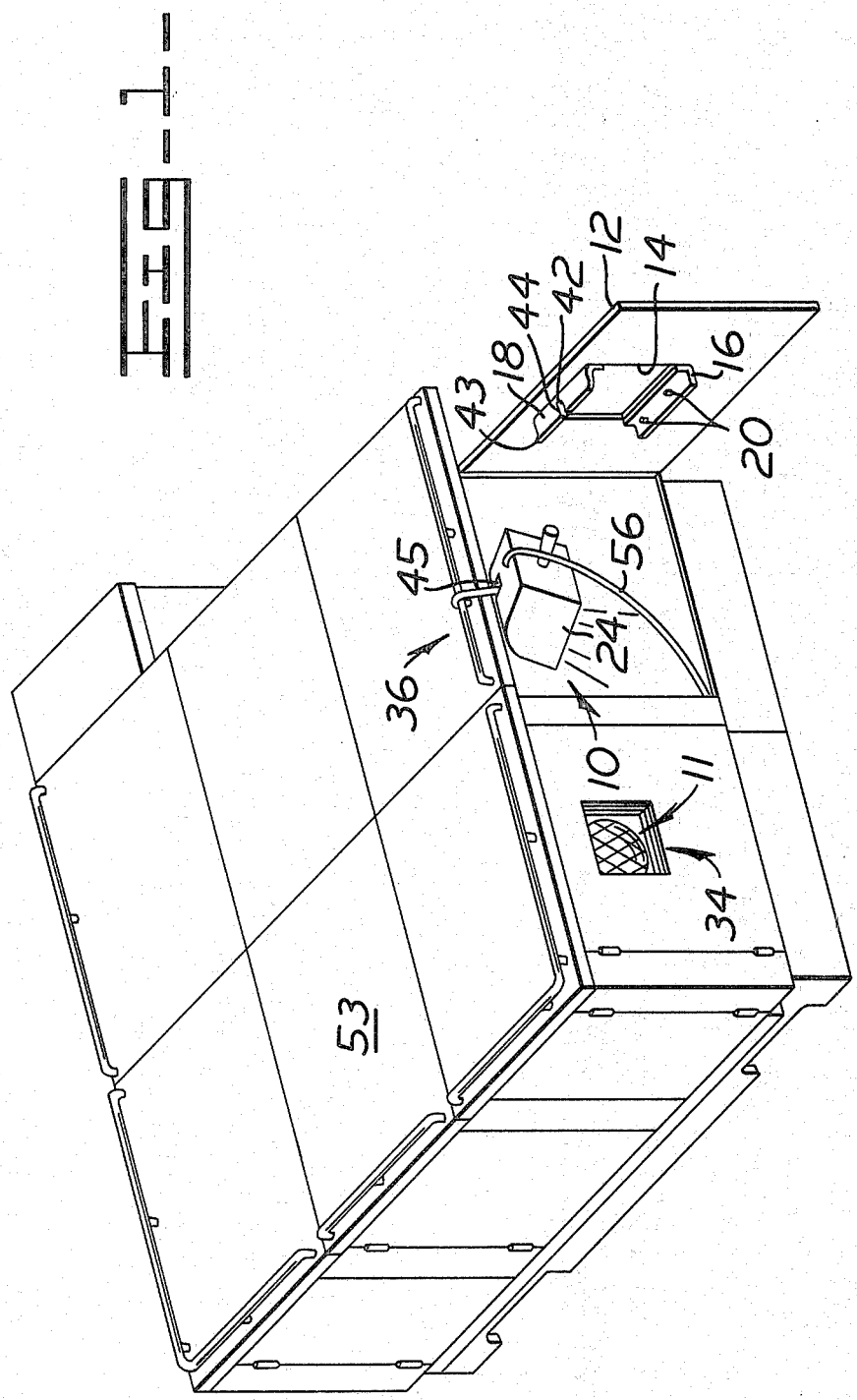

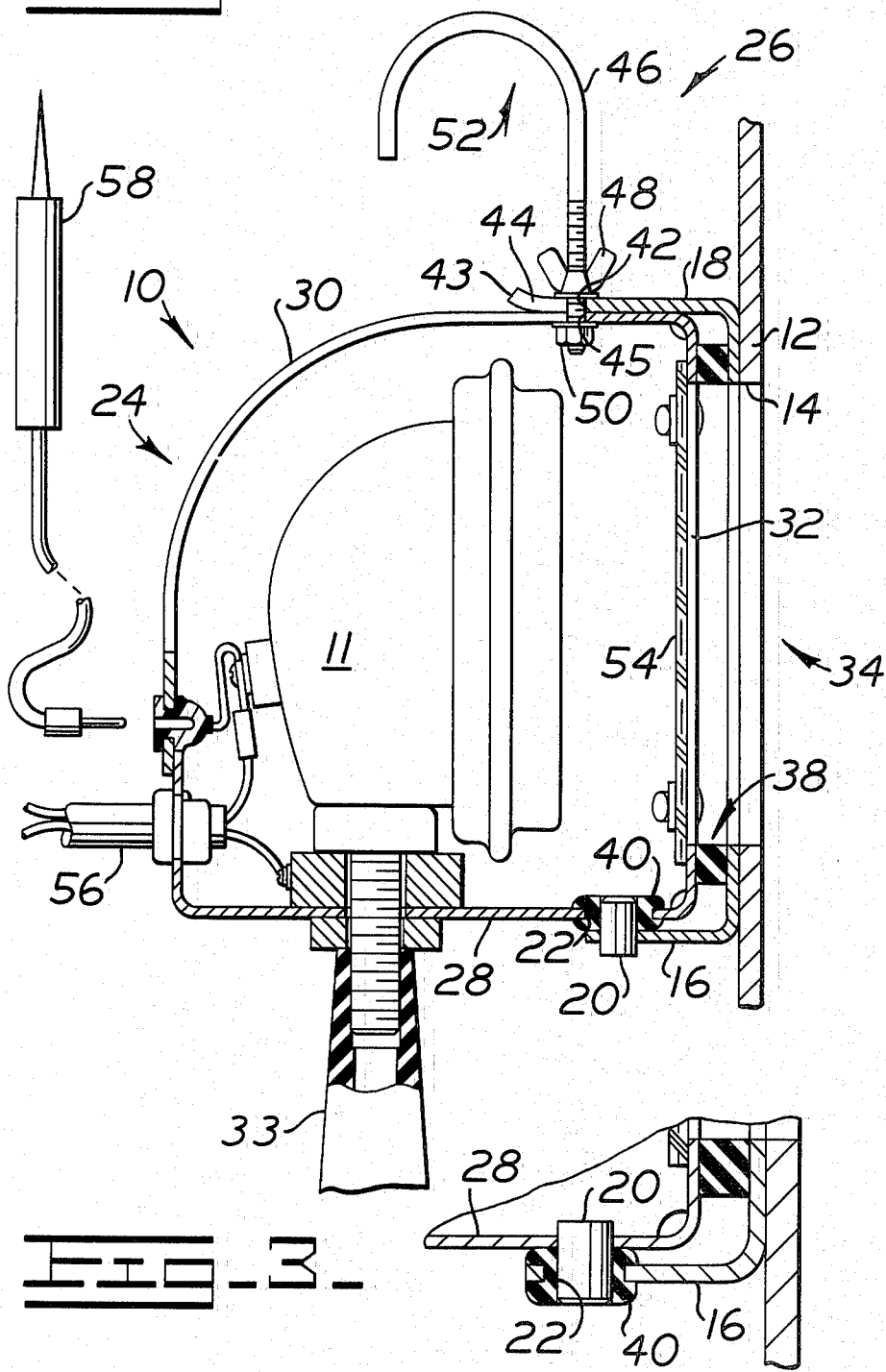

APPARATUS FOR A REMOVABLE LAMP

TECHNICAL FIELD

The invention relates to a housing assembly for removably connecting a lamp to a frame of, for example, a work vehicle or machine. More particularly, the invention relates to a lamp housing and a flange of the frame each having a respective one of a protrusion and opening mated at a first position of the housing and means for removably connecting the lamp housing to the frame and maintaining the lamp housing in the first position.

BACKGROUND ART

In the use of a housing assembly, it is desirable to removably connect a lamp to a frame of, for example, a work vehicle to use the lamp for illumination during operation of the vehicle and provide removal of the lamp for use as an inspection lamp.

A work vehicle commonly has a lamp connected to the frame to provide illumination of a general area during vehicle operation. However, the operator of the vehicle sometimes needs to inspect various portions of the vehicle. A lamp fixed to the vehicle is not of use in such inspections. The inspection is, therefore, sometimes delayed owing to the unavailability of a movable lamp to illuminate the inspection area. This represents a waste of time and labor.

Therefore, it is desirable to removably connect the housing of the lamp to the frame of the vehicle for use of the lamp when connected to the vehicle and as an inspection lamp when removed from the vehicle.

DISCLOSURE OF THE INVENTION

In one aspect of the invention, a housing assembly for removably connecting a lamp to a frame has a lamp housing and means. The frame has an opening and a first flange. Said first flange has one of a mateable protrusion and opening. The lamp housing has first and second opposed walls and a front wall. Said housing is movable between a first position at which the front wall covers the opening of the frame and a second position at which the front wall is spaced from the opening of the frame. The first wall has the other of the mateable protrusion and opening. The protrusion and opening are mated at the first position of said lamp housing. The means is provided for removably connecting the lamp housing to the frame and maintaining said housing in the first position.

A lamp is connected to a frame of a work vehicle or machine to provide illumination of an area during operation of the vehicle or machine. A lamp is sometimes necessary to illuminate a specific area of the vehicle for inspection purposes. In the housing assembly, the lamp is removably connected to the frame for illuminating an area during operation of the associated vehicle or machine and for use as an inspection lamp when removed from the vehicle or machine.

BRIEF DESCRIPTION OF THE DRAWINGS

FIG. 1 is a diagrammatic view showing an embodiment of the invention;

FIG. 2 is a diagrammatic view showing an embodiment of the invention in greater detail; and FIG. 3 is a diagrammatic view showing another embodiment of the invention.

BEST MODE FOR CARRYING OUT THE INVENTION

Referring to the drawings, a housing assembly 10 is provided for removably connecting a lamp 11 to a frame 12. The frame 12 has an opening 14 and first and second flanges 16,18. The first flange 16 has one of a mateable protrusion 20 and opening 22 (FIGS. 2 and 3).

The housing assembly 10 has a lamp housing 24 and a connecting means 26, as later more fully described. The lamp housing 24 has first and second opposed walls 28,30 and a front wall 32 and is of a size sufficient for substantially enclosing the lamp 11. A handle 33 is connected to the first wall 28. Said housing 24 is movable between a first position 34 at which the front wall 32 covers the opening 14 of the frame 12 and a second position 36 at which the front wall 32 is spaced from the opening 14 of the frame 12. It is desirable that the housing assembly 10 have means 38 for sealing the front wall 32 of the lamp housing 24 to the frame 12. The sealing means 38 is shown as an elastomeric seal 38 positioned about the opening 14 of the frame 12.

The first wall 28 of the lamp housing 24 has the other of the mateable protrusion 20 and opening 22. Preferably, a grommet 40 is positioned in the mateable opening 22 of the one of the first flange 16 of the frame 12 and first wall 28. The protrusion 20 and opening 22 are mated at the first position 34 of the housing 24. The protrusion 20 is preferably a pin 20 connected to the first flange 16. In the preferred embodiment, the first flange 16 and first wall each have a respective one of a pair of mateable protrusions 20 and openings 22 (FIG. 1). It should be understood that the protrustion 20 and opening 22 can be of other configurations as is known in the art without departing from the invention.

The means 26 is provided for removably connecting the lamp housing 24 to the frame 12 and maintaining said housing 24 in the first position 34. The second flange 18 of the frame 12 has an opening 42 and edge 43. Said second flange 18 preferably has a first slot 44 communicating with said edge 43 and opening 42. The second wall 30 of the lamp housing 24 also has an opening 45. As is shown, the opening 45 is preferably a second slot 45. The connecting means 26 preferably includes a rod 46 passing through said openings 42,45 at the first position 34 of the housing 24. As is shown, said means 26 also includes a wing nut 48 and nut 50 threadably connectable to the rod 46. The rod 46 also has an end portion 52 of a hook configuration. The means 26 can be of other configurations as is known in the art without departing from the invention.

INDUSTRIAL APPLICABILITY

In the use of the housing assembly 10, the lamp housing 24 is connected to the frame 12 for use of the lamp 11 to illuminate a general area relative to the frame 12. The lamp housing 24 is removed from the frame 12 for use of the lamp 11 at an area removed from the mounting location on the frame 12.

For example, the lamp 11 and housing assembly 10 are associated with a work vehicle 53. The lamp 11 is protected from the environment by the lamp housing 24. Illumination is provided through a lens portion 54 of the front wall 32 of said housing 24. At the second position 36 of the lamp housing 24, the lamp 11 is usable as a hand-held inspection or trouble lamp (FIG. 1). The wing nut 48 and nut 50 maintain the rod 46 connected to the lamp housing 24. The hook-shaped end portion 52 of said rod 46 rotates and is used to hang the lamp 11 at a work location to free the operator or mechanic for other duties. As is shown in FIG. 1, the attitude of the rod 46 relative to the lamp housing 24 is adjusted for directing illumination from the lamp 11 at an angle toward the work location. The wing nut 48 and nut 50 are loosened. The rod 46 is moved to a desired position and secured with the wing nut 48 and nut 50. Illumination from lamp 11 is thereby directed at the desired angle owing to the curvature of the second wall 30.

In order to connect the lamp 11 and housing 24 to the fram 12, the lamp housing 24 is oriented relative to the first flange 16 such that the pins 20 are positioned in the respective openings 22 of the first wall 28 of the lamp housing 24. The grommet 40 provides a flexible opening to conveniently receive the pin 20 and seal the interior of the housing 24. Said housing 24 is moved in a direction toward the frame 12 to laterally move the rod 46 in the slot 44 toward the opening 42 in the second flange 18. The wing nut 48 is tightened to secure the rod 46 in the position at which said rod 46 passes through the openings 42,45 of the second flange and second wall.

At said first position 34 of the lamp housing 24, the front wall 32 urges against the seal 38 to protect against entry of foreign objects through the opening 14 of the frame 12 and into the vehicle (FIG. 2). Illumination by the lamp 11 is provided through the aligned lens portion 54 of the front wall 32 and opening 14 of the frame 12. A power supply cord 56 connecting the lamp 11 to a power source (not shown) of the vehicle 53 has sufficient length and flexibility to accommodate moving the lamp 11 between the first and second positions 34,36. Also, a probe 58 is shown removably connected to the lamp 11. The probe 58 is used to test electrical continuity by illuminating the lamp 11 when placed in direct or indirect contact with the ungrounded terminal of the battery of the vehicle 53.

Other aspects, objects and advantages of this invention can be obtained from a study of the drawings, the disclosure and the appended claims.

What is claimed is:

1. A housing assembly (10) for removably connecting a lamp (11) to a frame (12) having an opening (14) and a first flange (16) having one of a mateable protrusion (20) and opening (22), comprising:
    a lamp housing (24) having first and second opposed walls (28,30) and a front wall (32) and being of a size sufficient for substantially enclosing the lamp (11) and movable between a first position (34) at which the front wall (32) covers the opening (14) of the frame (12) and a second position (36) at which the front wall (32) is spaced from the opening (14) of the frame (12), said first wall (28) having the other of the mateable protrusion (20) and opening (22), said protrusion (20) and opening (22) being mated at the first position (34) of the lamp housing (24); and
    means (26) for removably connecting the lamp housing (24) to the frame (12) and maintaining said lamp housing (24) in the first position (34).

2. The housing assembly (10), as set forth in claim 1, wherein the frame (12) has a second flange (18) having an opening (42), the second wall (30) of the lamp housing (24) has an opening (45) and wherein the connecting means (26) includes a rod (46) passing through said openings (42,45) of the second flange (18) and second wall (30) at the first position (34) of the lamp housing (24).

3. The housing assembly (10), as set forth in claim 2, wherein the rod (46) has an end portion (52) of a hook configuration.

4. The housing assembly (10), as set forth in claim 2, wherein the second flange (18) of the frame (12) has an edge (43) and a slot (44) communicating with the edge (43) and the opening (42) of said second flange (18).

5. The housing assembly (10), as set forth in claim 1, including means (38) for sealing said front wall (32) of the lamp housing (24) to the frame (12).

6. The housing assembly (10), as set forth in claim 2, wherein the sealing means (38) is an elastomeric seal (38) positioned about the opening (14) of the frame (12).

7. The housing assembly (10), as set forth in claim 1, wherein the lamp housing (24) has a handle (33) connected to the first wall (28).

8. The housing assembly (10), as set forth in claim 1, including a grommet (40) positioned in the mateable opening (22) of the one of first flange (16) of the frame (12) and first wall (28) of the housing (24).

9. Apparatus, comprising:
    a frame (12) having an opening (14) and a first flange (12) portion having one of a mateable protrusion (20) and opening (22);
    a lamp housing (24) having first and second opposed walls (28,30) and a front wall (32) and being of a size sufficient for substantially enclosing the lamp (11) and movable between a first position (34) at which the front wall (32) covers the opening (14) of the frame (12) and a second position (36) at which the front wall (32) is spaced from the opening (14) of the frame (12), said first wall (28) having the other of the mateable protrusion (20) and opening (22), said protrusion (20) and opening (22) being mated at the first position (34) of the lamp housing (24);
    a lamp (11) positioned in said lamp housing (24); and
    means (26) for removably connecting the lamp housing (24) to the frame (12) and maintaining said lamp housing (24) in the first position (34).

* * * * *